US012212462B2

(12) United States Patent
Corston-Petrie et al.

(10) Patent No.: US 12,212,462 B2
(45) Date of Patent: Jan. 28, 2025

(54) METHOD OF OPERATING A TELECOMMUNICATIONS NETWORK

(71) Applicant: BRITISH TELECOMMUNICATIONS PUBLIC LIMITED COMPANY, London (GB)

(72) Inventors: Andrew Corston-Petrie, London (GB); Ruth Brown, London (GB); Jonathan Hart, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/915,446

(22) PCT Filed: Feb. 9, 2021

(86) PCT No.: PCT/EP2021/053027
§ 371 (c)(1),
(2) Date: Sep. 28, 2022

(87) PCT Pub. No.: WO2021/197695
PCT Pub. Date: Oct. 7, 2021

(65) Prior Publication Data
US 2024/0297821 A1 Sep. 5, 2024

(30) Foreign Application Priority Data
Mar. 31, 2020 (EP) .................................... 20167212

(51) Int. Cl.
*H04L 41/0823* (2022.01)
*H04L 41/0816* (2022.01)
*H04L 41/5009* (2022.01)

(52) U.S. Cl.
CPC ...... *H04L 41/0836* (2013.01); *H04L 41/0816* (2013.01); *H04L 41/5012* (2013.01)

(58) Field of Classification Search
CPC ............ H04L 41/0836; H04L 41/0816; H04L 41/5012
See application file for complete search history.

(56) References Cited

U.S. PATENT DOCUMENTS 6,704,752 B1 3/2004 Kathail et al.
7,162,537 B1 1/2007 Kathail
(Continued)

FOREIGN PATENT DOCUMENTS

EP 1 326 375 7/2003
EP 2 445 141 4/2012
EP 3 544 330 9/2019

OTHER PUBLICATIONS

Extended European Search Report dated Oct. 1, 2020 issued for European Application No. 20167212.8 (9 pages).
(Continued)

*Primary Examiner* — Soe Hlaing
(74) *Attorney, Agent, or Firm* — Nixon & Vanderhye P.C.

(57) ABSTRACT

A computer-implemented method (200) of managing a telecommunications network (110), the telecommunication network comprising a network orchestrator (120), a plurality of network nodes (150) and a network ledger (140) for electronically storing data, the method comprising the steps of: the network orchestrator generating an instruction for reconfiguring at least one of the plurality of nodes (210); in response to generating said instruction, requesting and retrieving first status information from the at least one of the plurality of nodes (240); recording the instruction and the first status information to the network ledger (240)); communicating the instruction to the at least one of the plurality of nodes thereby to effect the instructed reconfiguration (230); in response to effecting the instructed reconfiguration, requesting and retrieving second status information from the
(Continued)

at least one of the plurality of nodes; and recording said second status information in the network ledger (280).

22 Claims, 2 Drawing Sheets

(56) References Cited

U.S. PATENT DOCUMENTS

| | | | |
|---|---|---|---|
| 7,290,164 | B1 | 10/2007 | Harvey et al. |
| 9,201,647 | B2* | 12/2015 | El-Assir .................... G06F 8/61 |
| 9,247,440 | B2 | 1/2016 | Ho et al. |
| 10,164,858 | B2 | 12/2018 | Gunasekara et al. |
| 10,469,318 | B1 | 11/2019 | Parthasarathy et al. |
| 10,476,985 | B1 | 11/2019 | Spina et al. |
| 2006/0168158 | A1* | 7/2006 | Das .................... H04L 67/34 709/220 |
| 2014/0280833 | A1 | 9/2014 | Gao et al. |
| 2017/0124487 | A1 | 5/2017 | Szeto et al. |
| 2018/0270122 | A1 | 9/2018 | Brown et al. |
| 2019/0273672 | A1 | 9/2019 | Shaw et al. |
| 2019/0342338 | A1 | 11/2019 | Anandam et al. |
| 2020/0336374 | A1 | 10/2020 | Clark et al. |
| 2021/0014127 | A1 | 1/2021 | Iyengar et al. |

OTHER PUBLICATIONS

Combined Search and Examination Report dated Jan. 7, 2021 issued for GB Application No. GB2004696.7 (10 pages).
Examination Report under Section 18(3) dated Jul. 18, 2022 issued for GB Application No. GB2004696.7 (3 pages).
International Search Report and Written Opinion of the International Searching Authority dated Apr. 14, 2021 issued for International Application No. PCT/EP2021/053027 (13 pages).
Search Report under Section 17 dated Jun. 25, 2021 issued for GB Application No. GB2102850.1 (4 pages).
International Search Report and Written Opinion of the International Searching Authority dated May 27, 2022 issued for International Application No. PCT/EP2022/054136 (17 pages).
Tumbde, Adwait & Renzelmann, Matthew & Swift, Michael, University of Wisconsin-Madison, "Configuration Data Deserves a Database" (2009) (5 pages).
Muriel Figueredo Franco et al., "BRAIN: Blockchain-based Reverse Auction for Infrastructure Supply in Virtual Network Functions-as-a-Service", 2019 IFIP Networking Conference, May 20, 2019, 9 pp.

* cited by examiner

METHOD OF OPERATING A TELECOMMUNICATIONS NETWORK

CROSS-REFERENCE TO RELATED APPLICATION(S)

This application is the U.S. national phase of International Application No. PCT/EP2021/053027 filed Feb. 9, 2021, which designated the U.S. and claims priority to EP 20167212.8 filed Mar. 31, 2020, the entire contents of each of which are hereby incorporated by reference.

FIELD OF INVENTION

The present invention relates to a method of operating a telecommunications network.

BACKGROUND

Telecommunications networks are expected to grow in scale and complexity, as well as to adopt greater 'softwarization', which affords greater flexibility as to how telecommunications network are configured.

With this increased complexity and flexibility, reconfigurations to a telecommunications network will likely require greater scrutiny in order to ensure that any reconfigurations are unlikely to cause detrimental effects to the operation of the telecommunications network. Reconfigurations may therefore be assessed so as to avoid unplanned network downtime, which may cause a breach in a Service Level Agreement, and in turn reputational and financial damage for a telecommunications network operator.

Currently, manual user input may be required in order to plan, verify and implement reconfigurations to a telecommunications network. To limit the extent of any detrimental effects to a telecommunications network, reconfigurations are typically applied step-wise to limited and isolated portions of the telecommunications network, such as particular network domains, rather than applied network-wide all at once.

Furthermore, in the event of a reconfiguration error, rolling back changes may also require consideration by an experienced human user and manual input; this is, not least, because not all reconfigurations are directly time-reversible and a substantially different and non-trivial reconfiguration may be required to revert the network to a prior state.

As such, reconfiguring telecommunications networks may be a slow, resource-intensive and poorly-scalable process, with ever increasing challenges as telecommunications networks grow in size and complexity.

It is therefore an aim of the present invention to alleviate at least some of the aforementioned problems.

Statements of Invention

According to a first aspect of the present invention, there is provided: a computer-implemented method of managing a telecommunications network, the telecommunication network comprising a network orchestrator, a plurality of network nodes and a network ledger for electronically storing data, the method comprising the steps of: the network orchestrator generating an instruction for reconfiguring at least one of the plurality of nodes; in response to generating said instruction, requesting and retrieving first status information from the at least one of the plurality of nodes; recording the instruction and the first status information to the network ledger; communicating the instruction to the at least one of the plurality of nodes thereby to effect the instructed reconfiguration; in response to effecting the instructed reconfiguration, requesting and retrieving second status information from the at least one of the plurality of nodes; and recording said second status information in the network ledger.

Optionally, said instruction is communicated to the at least one of the plurality of nodes by means of a network controller, said network controller being in communication with the network orchestrator.

Optionally, an acknowledgement is generated by the at least one of the plurality of network nodes in response to effecting the instructions, thereby triggering the requesting and retrieving of the second status information.

Preferably, the first and the second status information is recorded in the network ledger against a unique identifier for the network node from which said status information is received.

Optionally, the first and the second status information are recorded to network ledger in association with the instruction. Optionally, the first and the second status information are retrieved and recorded from all of the plurality of network nodes. Optionally, the first and the second status information are retrieved and recorded for only the at least one of the plurality of nodes.

Preferably, the method further comprises the steps of: interrogating the network ledger so as to ascertain that the network orchestrator has write access to the network ledger; and communicating the instruction to the at least one of the plurality of nodes only in response to identifying that the network orchestrator has write access to the network ledger.

Preferably, the network ledger is only accessible for write access by a single network entity at a time, and wherein the network orchestrator is a network entity.

Preferably, every instruction that is generated by the network orchestrator is recorded to the network ledger, and more preferably, status information is recorded to the network ledger (optionally, immediately) prior to and after effecting any instruction.

Preferably, the instruction, first and/or status information are immutably recorded in the network ledger, and more preferably, are recorded using blockchain.

Preferably, the instruction is recorded in the network ledger in association with sequence information. The sequence information may be in the form of a time value or a sequence number. Preferably, the first and/or second status information is/are also recorded in the database in association with the sequence information, and in particular with a time value.

Preferably, the method further comprises the steps of: analysing the second status information and identifying a reduction in performance of the telecommunications network based on the second status information; in response to identifying the reduction in performance, retrieving the instruction from the network ledger and generating a further instruction to reconfigure the telecommunications network so as to reverse the instruction. Optionally, the further instruction is configured to reverse the instruction by negating the instruction or by reversing its effect. Optionally, the further instruction is configured to reconfigure the at least one of the plurality of network nodes or a network node other than the at least one of the plurality of network nodes.

Preferably, the method is performed for a plurality of instructions, and wherein a further instruction is generated for each of said plurality of instructions in an order that reverses the sequence information for each of the plurality of instructions. Preferably, the further instruction is generated so as to revert the at least one of the plurality of network nodes to match the first status information.

Preferably, the telecommunications network comprises a portion for processing live network traffic and a reference and/or a clone network, and wherein the instruction is for reconfiguring the reference and/or the clone network, and optionally only the reference and/or the clone network.

Preferably, the method further comprises the steps of: identifying an improvement in performance of the telecommunications network based on the second status information; and in response to identifying the improvement in performance, effecting the instruction to the at least one of the plurality of network nodes in the portion of the telecommunications network that processes live network traffic. Optionally, identifying the reduction and/or improvement in performance of the telecommunications network is performed by comparing the second status information to the first status information. Optionally, identifying the reduction and/or improvement in performance of the telecommunications network is performed by comparing the second status information to a threshold value.

Preferably, the network ledger comprises historical data in turn comprising a plurality of historical instructions, historical first status information and historical second status information, wherein said historical instructions, first status information and second status information is obtained according to a method as described above, and the method further comprises the step of generating the instruction by means of a machine learning algorithm that is trained on the historical data. Optionally, the method further comprises the step of preventing the network orchestrator from effecting an erroneous instruction by means of a machine learning algorithm trained on the plurality of historical data.

Preferably, the method further comprises the steps of: analysing the instruction, first status information and the second status information; and generating a mapping of causal relationships between the plurality of network nodes in dependence on said analysing.

Optionally, generating a mapping of causal relationships is performed by means of probabilistic analysis. Optionally, said analysing comprises performing pattern detection.

According to another aspect of the invention, there is provided a computer-readable storage medium comprising instructions that, when executed by a processor associated with a telecommunications network, causes the telecommunication network to perform a method as described above.

According to yet another aspect of the invention, there is provided a telecommunications network comprising: a plurality of network nodes; a network ledger for electronically storing data; and a network orchestrator configured to: generate an instruction for reconfiguring at least one of the plurality of nodes; request and retrieve first status information from the at least one of the plurality of nodes in response to generating said instruction; cause recording of the instruction and the first status information to the network ledger; communicate the instruction to the at least one of the plurality of nodes thereby to effect the instructed reconfiguration; request and retrieve second status information from the at least one of the plurality of nodes in response to effecting the instructed reconfiguration; and cause recording of said second status information in the network ledger. Optionally, the network orchestrator comprises a network controller and/or is configured to perform the aforementioned steps via the network controller.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination.

Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a method of managing a telecommunications network and to a telecommunications network as described herein and/or substantially as illustrated with reference to the accompanying drawings. The present invention is now described, purely by way of example, with reference to the accompanying diagrammatic drawings, in which.

SPECIFIC DESCRIPTION

Figure 1:
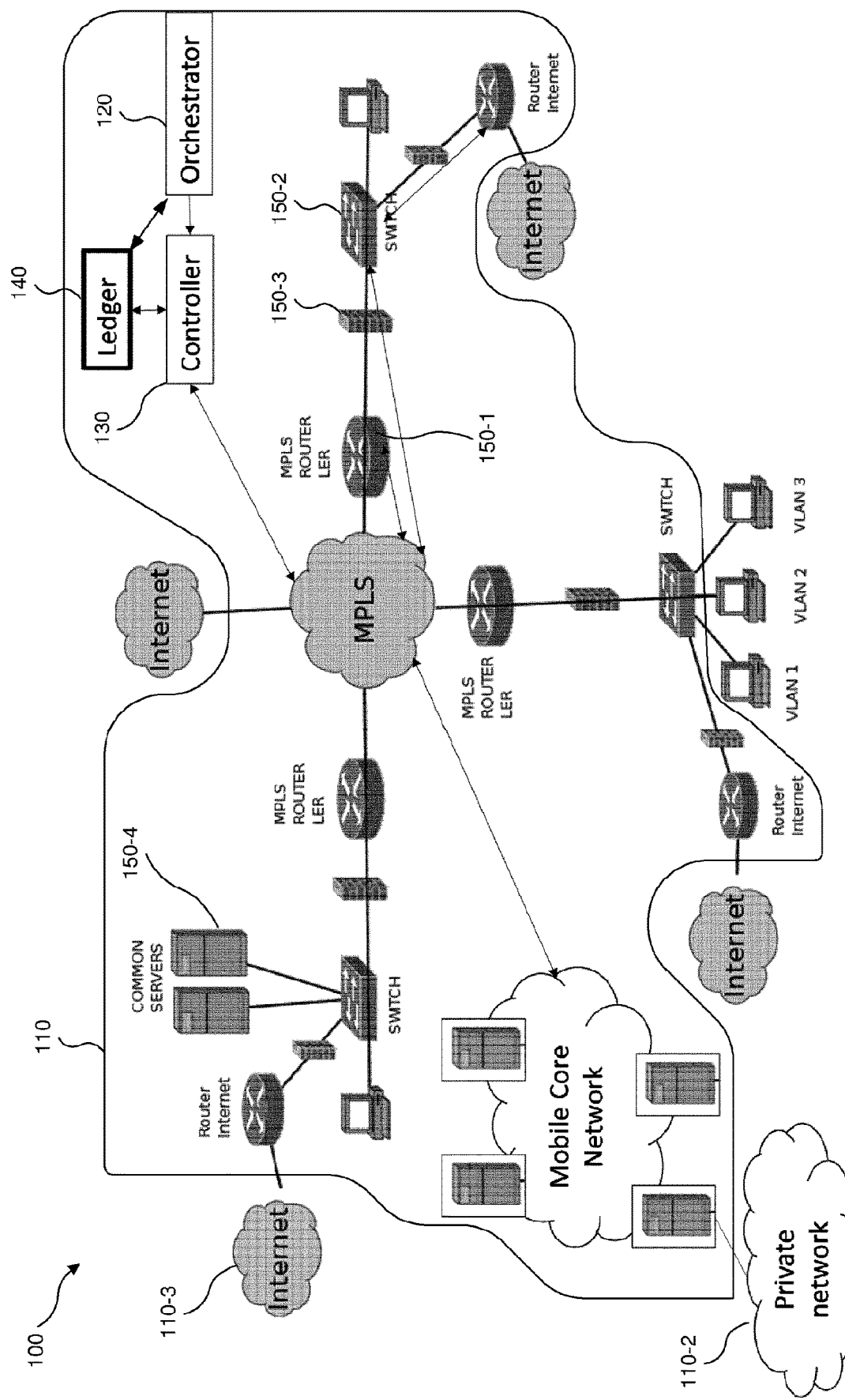
FIG. 1 is a schematic diagram of a telecommunications network.

FIG. 1 is a schematic diagram of an exemplary telecommunications network 100, comprising a wide area telecommunications network in the form of a cellular telecommunications network 110-1, which is in turn available to communicate with other networks, including a private telecommunications network 110-2 and the Internet 110-3.

The cellular telecommunications network 110-1 comprises: a Network Orchestrator 120; a Network Controller 130; a plurality of network nodes 150; and an electronic database (herein also referred to as the Network Ledger) 140.

The Network Orchestrator 120 is configured to generate instructions for reconfiguring the network nodes 150, thereby to reconfigure the cellular wide area telecommunications network 110.

A network reconfiguration instruction is available to include:
  a unique identifier of a network node that is the target of reconfiguration; and
  an action to reconfigure a network node so as to change the way in which a network node operates, including for example:

a change to operational parameters, including:
  winding-up or down of processing (e.g. CPU) and memory (e.g. RAM) resources;
  a reboot, restart and/or shut down;
  creation of a new virtualised network node;
  changes to a security policy;
  wireless transmission parameters, such as transmission power and/or spectral frequency;
  a software update; and
a change to networking parameters, including:
  throttling traffic;
  amended traffic routing rules;
  address and/or port blocking; and
  VPN configuration.

The Network Orchestrator 120 is in communication with the Network Controller 130, which is configured to effect implementation of the instructions generated by the Network Orchestrator to the appropriate network node(s) 150.

The network nodes 150 are functional components of the cellular telecommunications network 110-1 that help facilitate operation of the network 110-1, and include a: router 150-1 (including a Multiprotocol Label Switching router); switch 150-2; firewall 150-3; and server 150-4. Although not shown in FIG. 1, a network node 150 is available to be in the form of a: gateway; access point; database; controller or processor; or virtualised network function.

The Network Orchestrator 120 and the Network Controller 130 are each in communication with the Network Ledger 140.

Figure 2:
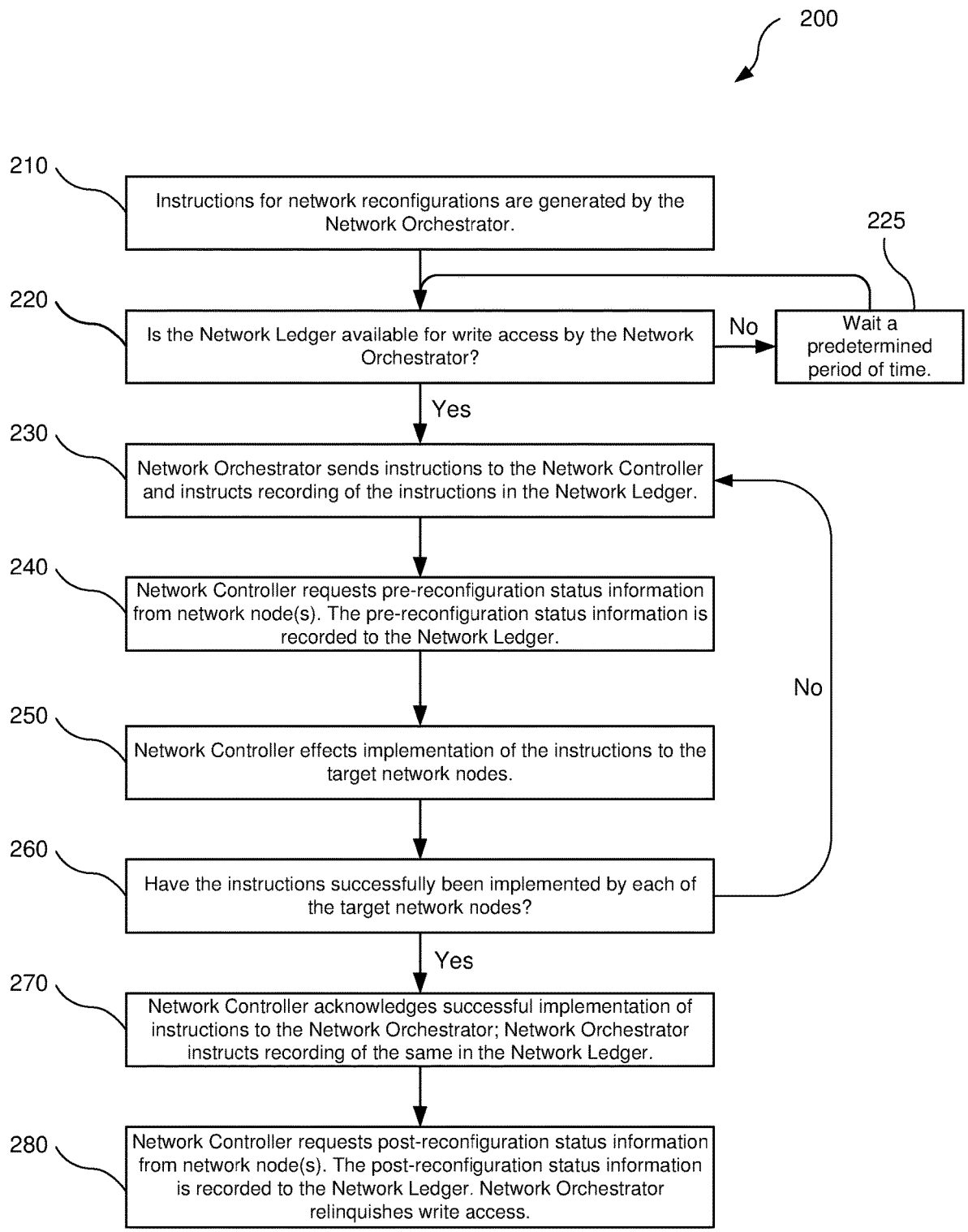
FIG. 2 shows a process for operating the telecommunications network.

FIG. 2 shows a process 200 for operating the cellular telecommunications network 110.

In a first step 210, the Network Orchestrator 120 generates instructions for reconfiguring at least one of the plurality of network nodes 150. At a next step 220, the Network Orchestrator interrogates the Network Ledger 140 to determine whether or not the Network Ledger is available for write access by the Network Orchestrator 120.

If the Network Ledger 140 is not available, then the Network Orchestrator waits a predetermined period of time 225 and then reiterates to step 220. If the Network Ledger 140 is available, the Network Orchestrator 120 reserves exclusive write access to the Network Ledger and process 200 then proceeds to step 230.

At step 230, the Network Orchestrator 120 instructs the Network Controller 120 to implement the instructions that were generated at step 210. At the same time, the Network Orchestrator 120 also communicates the instructions to the Network Ledger 140, and the Network Ledger records the instructions.

Upon receipt of the instructions by the Network Controller 120, at step 240, the Network Controller processes the instructions so as identify the network nodes targeted by the instructions (which includes at least one of the network nodes 150), and instructs each identified target network node to respond to the Network Controller with its status information; this status information is retrieved prior to implementation (and communication) of the instructions to any target network node, and is therefore referred to as pre-reconfiguration status information.

The status information includes information pertaining to the performance and characteristics of a network node 150, and includes, for example:
  a unique identifier of the network node (such as a network address);
  network performance metrics, including:
    processing load and/or memory capacity;
    bandwidth;
    latency;
    jitter;
    ping;
    listing of routing tables and/or neighbours; and
  operational characteristic information, including:
    software (including operating system) type and version; and hardware type and version.

The pre-reconfiguration status information is subsequently received by the Network Controller 120 from each target network node and then communicated to the Network Orchestrator at step 240. Subsequently, the Network Orchestrator communicates the pre-reconfiguration status information to the Network Ledger so as to record the pre-reconfiguration status information within the Network Ledger at step 240. The pre-reconfiguration status information is recorded to the Network Ledger in a record that is associated with the instructions that were recorded in the Network Ledger at preceding step 230.

Having recorded the pre-reconfiguration status information in the Network Ledger, the Network Controller implements the instructions to the target network nodes at step 250. At a next step 260, the Network Controller queries whether or not the instructions have been correctly implemented by each of the target network nodes; if not, the process reiterates to step 230; if so, then the process continues to step 270.

Once the instructions have been correctly implemented by each of the target network nodes, at step 270, the Network Controller acknowledges to the Network Orchestrator successful implementation of the instructions. In response, the Network Orchestrator instructs the Network Ledger to record, against the instructions recorded at step 230, successful implementation of the instructions.

In response to the acknowledgement from the Network Controller that the instructions have successfully been implemented, the Network Orchestrator instructs the Network Controller again to retrieve status information from the target network nodes; at this point, status information is retrieved only after successful implementation of the instructions, and is therefore referred to as post-reconfiguration status information.

The post-reconfiguration status information is subsequently received by the Network Controller from each target network node, and the post-reconfiguration status information is communicated by the Network Controller to the Network Orchestrator. The Network Orchestrator communicates the post-reconfiguration status information to the Network Ledger so as to record the post-reconfiguration status information within the Network Ledger at step 280. The post-reconfiguration status information is recorded in the Network Ledger in a record that is associated with the instructions that were recorded in the Network Ledger at preceding step 230.

Once the post-reconfiguration status information has been recorded to the Network Ledger, the Network Orchestrator relinquishes write access to the Network Ledger, and process 200 then ends.

Process 200 is available to be initiated in response to each and every instance of the Network Orchestrator generating instructions for network reconfigurations (i.e. step 210). In this way, the Network Ledger is populated with an exhaustive record of all reconfigurations that have successfully been applied to the cellular telecommunications network 110, along with the pre- and post-reconfiguration status information from each of the target network nodes. In turn, the Network Ledger is available to facilitate additional functionality of the cellular telecommunications network so as to help improve reliability with which reconfigurations are managed in the cellular telecommunications network.

The Network Ledger 140 maintains, against each network reconfiguration (and, by association, the pre- and post-reconfiguration status information), sequence information as to when (either in absolute terms, such by means of a timestamp, or in relative terms such as an ordered list) a network reconfiguration is instructed and/or successfully applied. In this way, information concerning the sequence of network reconfigurations is preserved within the Network Ledger.

In the event that the cellular telecommunications network identifies (specifically, for example, the Network Controller) that a network reconfiguration has caused reduced performance to the network or to a network node (determined, for example, based on post-reconfiguration status information), the Network Orchestrator is instructed by the Network Controller to perform reversal of a previously-implemented network reconfiguration so as to return the telecommunications network to a state without the reduced performance (herein referred to as a "normal state").

To this end, the Network Orchestrator retrieves from the Network Ledger the latest network reconfiguration that was applied to the telecommunications network, and instructs a network reconfiguration that reverses this latest network reconfiguration, either directly by negating the latest network reconfiguration or by issuing a new reconfiguration that achieves a state that matches the pre-configuration status information associated with the latest network reconfiguration.

The Network Orchestrator continues, in reverse sequence, to retrieve from the Network Ledger previous network reconfigurations and step-wise to instruct network reconfigurations that reverse each of these previous network reconfigurations until the cellular telecommunications network is returned to the normal state.

As per all instructions, each revision of a network reconfiguration is also recorded to the Network Ledger in accordance with process 200.

To help ensure accuracy in recording, the Network Ledger 140 is configured only to grant sole exclusive write access to a single network entity at a time, such as the Network Orchestrator.

In this example, the Network Ledger 140 is configured to store records (i.e. reconfiguration instructions, pre- and post-reconfiguration information and their associations to the reconfiguration instructions, and sequence information) in the form of immutable records; this is performed, for example, by implementing a blockchain process in the Network Ledger. In particular, the Network Ledger is therefore a distributed ledger.

In one example, the Network Ledger is accessible for both write and read access by the Network Orchestrator for a clone network (i.e. a telecommunications network that mimics the architecture of the cellular telecommunications network 110 on live infrastructure of the cellular telecommunications network, but without carrying live traffic or live services) and/or a reference network (i.e. a telecommunications network that mimics the cellular telecommunications network 110, but on infrastructure that is separate to the cellular telecommunications network 110, such as test equipment) portion/s of the cellular telecommunications network, thereby to allow process 200 to be performed also on the clone and reference networks.

In this way, network reconfigurations may first be simulated and tested on the clone and/or reference network, with the Network Ledger maintaining a record of the network reconfiguration that are applied to these networks. Accordingly, successful reconfigurations are then available to be implemented directly to the cellular telecommunication network for live traffic by reference to the instructions that were recorded on the Network Ledger from reconfigurations that were performed on the clone and/or reference network/s.

It is envisaged that with a sufficiently-populated Network Ledger, the Network Ledger is available to act as a repository of training data so as to train a machine learning algorithm for automatically implementing beneficial network reconfigurations and/or preventing potentially detrimental network reconfigurations.

Alternatives and Modifications

In one example, the pre- and/or post-reconfiguration status information is retrieved from all network nodes of the cellular telecommunications network. In this way, it is possible to identity hidden relationships that may be present in the event of particular network reconfigurations and/or between specific network nodes.

Furthermore, by performing causal analysis of the pre-reconfiguration status information, instructions and post-reconfiguration status information, a mapping of functional relationships (including hidden relationships) between the network nodes 150 is available to be developed. An improved understanding of the relational architecture of the network nodes 150 is thereby available to facilitate improved fault prevention in the cellular telecommunications network 110.

In the example of FIG. 1, a backbone of the cellular telecommunications network 110 is orientated upon a Multiprotocol Label Switching (MPLS) router. However, it will be appreciated that the cellular wide area telecommunications network is available to have any form of cellular network architecture including 3G, 4G and/or 5G architectures.

In the aforementioned, reference is made to a cellular telecommunication network. However, in an alternative, the cellular telecommunication network 110 is available to be any form of orchestrator-operated telecommunications network, including a fixed-access network, a local area network, a wide area network, or combination of network types (e.g. a HetNet).

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A computer-implemented method of managing a telecommunications network, the telecommunication network comprising a network orchestrator, a plurality of network nodes and a network ledger for electronically storing data, the method comprising the steps of:

generating, by means of the network orchestrator, an instruction for reconfiguring at least one of the plurality of nodes;

in response to generating said instruction, requesting and retrieving first status information from the at least one of the plurality of nodes;

recording the instruction and the first status information to the network ledger;

communicating the instruction to the at least one of the plurality of nodes thereby to effect the instructed reconfiguration;

in response to effecting the instructed reconfiguration, requesting and retrieving second status information from the at least one of the plurality of nodes; and recording said second status information in the network ledger;

analysing the second status information and identifying a reduction in performance of the telecommunications network based on the second status information; and in response to identifying the reduction in performance, retrieving the instruction from the network ledger and generating a further instruction to reconfigure the telecommunications network so as to reverse the instruction.

2. The method according to claim 1, wherein the first and the second status information are recorded to the network ledger in association with the instruction.

3. The method according to claim 1, wherein the first and the second status information are retrieved and recorded from all of the plurality of network nodes.

4. The method according to claim 1, wherein the first and the second status information are retrieved and recorded for only the at least one of the plurality of nodes.

5. The method according to claim 1, further comprising the steps of:
interrogating the network ledger so as to ascertain that the network orchestrator has write access to the network ledger; and
communicating the instruction to the at least one of the plurality of nodes only in response to identifying that the network orchestrator has write access to the network ledger.

6. The method according to claim 1, wherein the network ledger is only accessible for write access by a single network entity at a time, and wherein the network orchestrator is a network entity.

7. The method according to claim 1, wherein every instruction that is generated by the network orchestrator is recorded to the network ledger.

8. The method according to claim 1, wherein the instruction, the first status information and/or the status information are immutably recorded in the network ledger.

9. The method according to claim 1, wherein the instruction is recorded in the network ledger in association with sequence information.

10. The method according to claim 1, wherein the method is performed for a plurality of instructions, and wherein the further instruction is generated for each of said plurality of instructions in an order that reverses the sequence information for each of the plurality of instructions.

11. The method according to claim 10, wherein the further instruction is generated so as to revert the at least one of the plurality of network nodes to match the first status information.

12. The method according to claim 1, wherein the telecommunications network comprises a portion for processing live network traffic and a reference and/or a clone network, and wherein the instruction is for reconfiguring the reference and/or the clone network.

13. The method according to claim 12, further comprising the steps of:
identifying an improvement in performance of the telecommunications network based on the second status information; and
in response to identifying the improvement in performance, effecting the instruction to the at least one of the plurality of network nodes in the portion of the telecommunications network that processes live network traffic.

14. The method according to claim 1, the network ledger comprising historical data comprising a plurality of historical instructions, historical first status information and historical second status information, wherein said historical instructions, first status information and second status information is obtained, and the method further comprising the step of generating the instruction by means of a machine learning algorithm that is trained on the historical data.

15. The method according to claim 1, further comprising the steps of:
analysing the instruction, first status information and the second status information; and
generating a mapping of causal relationships between the plurality of network nodes in dependence on said analysing.

16. A non-transitory computer-readable storage medium comprising instructions that, when executed by a processor associated with a telecommunications network, causes the telecommunication network to perform the method according to claim 1.

17. A telecommunications network comprising:
a plurality of network nodes;
a network ledger for electronically storing data; and
a network orchestrator configured to:
generate an instruction for reconfiguring at least one of the plurality of nodes;
request and retrieve first status information from the at least one of the plurality of nodes in response to generating said instruction;
cause recording of the instruction and the first status information to the network ledger;
communicate the instruction to the at least one of the plurality of nodes thereby to effect the instructed reconfiguration;
request and retrieve second status information from the at least one of the plurality of nodes in response to effecting the instructed reconfiguration;
cause recording of said second status information in the network ledger;
analyze the second status information and identify a reduction in performance of the telecommunications network based on the second status information; and
in response to the identification of the reduction in performance, retrieve the instruction from the network ledger and generate a further instruction to reconfigure the telecommunications network so as to reverse the instruction.

18. A computer-implemented method of managing a telecommunications network, the telecommunication network comprising a network orchestrator, a plurality of network nodes and a network ledger for electronically storing data, the method comprising the steps of:
generating, by means of the network orchestrator, an instruction for reconfiguring at least one of the plurality of nodes;
in response to generating said instruction, requesting and retrieving first status information from the at least one of the plurality of nodes;
recording the instruction and the first status information to the network ledger;
communicating the instruction to the at least one of the plurality of nodes thereby to effect the instructed reconfiguration;

in response to effecting the instructed reconfiguration, requesting and retrieving second status information from the at least one of the plurality of nodes; and recording said second status information in the network ledger;

wherein the telecommunications network comprises a portion for processing live network traffic and a reference and/or a clone network, and wherein the instruction is for reconfiguring the reference and/or the clone network.

19. The method according to claim 18, further comprising the steps of:

identifying an improvement in performance of the telecommunications network based on the second status information; and in response to identifying the improvement in performance, effecting the instruction to the at least one of the plurality of network nodes in the portion of the telecommunications network that processes live network traffic.

20. A computer-implemented method of managing a telecommunications network, the telecommunication network comprising a network orchestrator, a plurality of network nodes and a network ledger for electronically storing data, the method comprising the steps of:

generating, by means of the network orchestrator, an instruction for reconfiguring at least one of the plurality of nodes;

in response to generating said instruction, requesting and retrieving first status information from the at least one of the plurality of nodes;

recording the instruction and the first status information to the network ledger;

communicating the instruction to the at least one of the plurality of nodes thereby to effect the instructed reconfiguration;

in response to effecting the instructed reconfiguration, requesting and retrieving second status information from the at least one of the plurality of nodes; and recording said second status information in the network ledger;

the network ledger comprising historical data comprising a plurality of historical instructions, historical first status information and historical second status information, wherein said historical instructions, first status information and second status information is obtained, and the method further comprising the step of generating the instruction by means of a machine learning algorithm that is trained on the historical data.

21. A computer-implemented method of managing a telecommunications network, the telecommunication network comprising a network orchestrator, a plurality of network nodes and a network ledger for electronically storing data, the method comprising the steps of:

generating, by means of the network orchestrator, an instruction for reconfiguring at least one of the plurality of nodes;

in response to generating said instruction, requesting and retrieving first status information from the at least one of the plurality of nodes;

recording the instruction and the first status information to the network ledger;

communicating the instruction to the at least one of the plurality of nodes thereby to effect the instructed reconfiguration;

in response to effecting the instructed reconfiguration, requesting and retrieving second status information from the at least one of the plurality of nodes;

recording said second status information in the network ledger;

analysing the instruction, first status information and the second status information; and generating a mapping of causal relationships between the plurality of network nodes in dependence on said analysing.

22. A computer-implemented method of managing a telecommunications network, the telecommunication network comprising a network orchestrator, a plurality of network nodes and a network ledger for electronically storing data, the method comprising the steps of:

generating, by means of the network orchestrator, an instruction for reconfiguring at least one of the plurality of nodes;

in response to generating said instruction, requesting and retrieving first status information from the at least one of the plurality of nodes;

recording the instruction and the first status information to the network ledger;

communicating the instruction to the at least one of the plurality of nodes thereby to effect the instructed reconfiguration;

in response to effecting the instructed reconfiguration, requesting and retrieving second status information from the at least one of the plurality of nodes;

recording said second status information in the network ledger;

interrogating the network ledger so as to ascertain that the network orchestrator has write access to the network ledger; and communicating the instruction to the at least one of the plurality of nodes only in response to identifying that the network orchestrator has write access to the network ledger.

* * * * *